United States Patent
Martin

(10) Patent No.: US 9,560,009 B1
(45) Date of Patent: Jan. 31, 2017

(54) SYSTEMS AND METHODS FOR COMMISSIONING A WIRELESS LIGHTING DEVICE WITH A MAGNETIC REED SWITCH

(71) Applicant: Barry Martin, Peachtree City, GA (US)

(72) Inventor: Barry Martin, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 332 days.

(21) Appl. No.: 14/204,805

(22) Filed: Mar. 11, 2014

Related U.S. Application Data

(60) Provisional application No. 61/789,254, filed on Mar. 15, 2013.

(51) Int. Cl.
| | | |
|---|---|---|
| G05B 11/01 | (2006.01) | |
| H04L 29/12 | (2006.01) | |
| F21V 23/04 | (2006.01) | |
| H05B 37/02 | (2006.01) | |

(52) U.S. Cl.
CPC .......... *H04L 61/35* (2013.01); *F21V 23/0435* (2013.01); *F21V 23/0442* (2013.01); *H04L 61/6022* (2013.01); *H05B 37/0272* (2013.01)

(58) Field of Classification Search
CPC . H05B 37/02; H05B 37/0209; H05B 37/0218; H05B 37/0245; H05B 37/0272; F21V 23/00; F21V 23/04; F21V 23/0435; F21V 23/0442; F21V 23/045; F21V 23/0464; F21V 23/0471; F21V 23/0478; H04L 61/35; H04L 61/6022
See application file for complete search history.

(56) References Cited

U.S. PATENT DOCUMENTS

| | | | | |
|---|---|---|---|---|
| 6,618,022 B2* | 9/2003 | Harvey | ............... | H01H 9/167 340/572.7 |
| 8,214,061 B2* | 7/2012 | Westrick, Jr. | ...... | H05B 37/0218 315/312 |
| 8,706,934 B2* | 4/2014 | Sleator | ............... | G06F 13/409 710/15 |
| 8,731,689 B2* | 5/2014 | Platner | ............ | H05B 37/0245 315/312 |
| 8,836,232 B2* | 9/2014 | Bailey | ............... | H05B 37/029 315/291 |
| 8,847,750 B1* | 9/2014 | Malakuti | ............ | H05B 37/0254 315/294 |
| 2007/0230962 A1* | 10/2007 | Fisher | ............... | G08C 17/02 398/106 |

(Continued)

*Primary Examiner* — Steven Lim
*Assistant Examiner* — Ryan Sherwin
(74) *Attorney, Agent, or Firm* — King & Spalding LLP

(57) ABSTRACT

The present disclosure provides techniques for commissioning a light switch and a control device. A wireless light system implementing such techniques includes a light switch comprising a first microcontroller, a first wireless transceiver, and a first magnetic reed switch. The wireless light system further includes a control device comprising a second microcontroller, a second wireless transceiver, and a second magnetic reed switch. When the second magnetic reed switch is closed, the control device transmits via the second wireless transceiver a second unique address to the first wireless transceiver. When the first magnetic reed switch is closed and when the first wireless transceiver receives the second unique address, the first wireless transceiver transmits to the second wireless transceiver a first unique address.

16 Claims, 3 Drawing Sheets

(56) References Cited

U.S. PATENT DOCUMENTS

2011/0031897 A1* 2/2011 Henig ................ H05B 37/0254
                                                    315/297
2014/0300276 A1* 10/2014 Wang ................. H04L 12/2807
                                                    315/151

* cited by examiner

US 9,560,009 B1

SYSTEMS AND METHODS FOR COMMISSIONING A WIRELESS LIGHTING DEVICE WITH A MAGNETIC REED SWITCH

CROSS-REFERENCE TO RELATED APPLICATIONS

This application claims priority under 35 U.S.C. §119 to U.S. Provisional Patent Application No. 61/789,254 titled "Systems and Methods for Commissioning a Wireless Lighting Device with a Magnetic Reed Switch," filed on Mar. 15, 2013, the entirety of which is incorporated by reference herein.

TECHNICAL FIELD

This disclosure relates generally to wireless lighting systems. Specifically, the present disclosure relates to commissioning a wireless lighting device using a magnetic reed switch.

BACKGROUND OF THE INVENTION

Wireless lighting fixtures have become prevalent in today's lighting systems. There are a wide range of control devices available to control wireless lighting fixtures, including mobile and fixed, which can be either line powered or battery powered. For example, a wireless lighting fixture can be controlled by a single (battery or line powered) occupancy sensor or by multiple occupancy sensors placed at various entry points to a building. The process of associating a sensor, such as an occupancy sensor, with a switch to control a wireless light fixture is called commissioning. Because the sensor and the switch typically communicate via radio frequency, it is important that the sensor be associated or commissioned with the correct switch. The process of commissioning wireless lighting fixtures to work with control devices can be a critical step in installing wireless light fixtures. For example, in a large installation there can be thousands of wireless lighting fixtures that need to be commissioned so that they can be controlled properly.

One current approach to commissioning wireless light fixtures involves assigning a MAC address to each light fixture. The MAC address is entered into a database. A computer communicates with each wireless light fixture via a wireless network and associates the MAC address in the database with the wireless light fixture. Additionally, a technician manually activates each wireless light fixture by flashing each device with an infrared signal which places the fixture in the join mode allowing it to be associated with a control device, such as an occupancy sensor. This can be a tedious and cumbersome process that is subject to operator error.

SUMMARY

According to an aspect of the present disclosure, a wireless light system comprises a light switch comprising a first microcontroller, a first wireless transceiver, and a first magnetic reed switch. The wireless light system further comprises a control device comprising a second microcontroller, a second wireless transceiver, and a second magnetic reed switch. When the second magnetic reed switch is closed, the control device transmits via the second wireless transceiver a second unique address to the first wireless transceiver. When the first magnetic reed switch is closed and when the first wireless transceiver receives the second unique address, the first wireless transceiver transmits to the second wireless transceiver a first unique address.

According to an aspect of the present disclosure, a wireless light system includes a switch device comprising a first microcontroller and a first magnetic reed switch. The wireless light system further includes a control device comprising a second microcontroller and a second magnetic reed switch. When the second magnetic reed switch is closed, the control device transmits a second unique address to the switch device. When the first magnetic reed switch is closed and when the switch device receives the second unique address, the switch device transmits a first unique address to the control device. When the switch device receives the second unique address and the control device receives the first unique address, the switch device and the control device are communicatively coupled.

According to an aspect of the present disclosure, a method of commissioning a switch device and a control device includes closing a first magnetic reed switch in the switch device, closing a second magnetic reed switch in the control device, transmitting a first unique address from the switch device to the control device, transmitting a second unique address from the control device to the switch device, receiving and storing the first unique address in the control device, and receiving and storing the second unique address in the switch device.

These and other aspects, features and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the claimed invention and the advantages thereof, reference is now made to the following description, in conjunction with the accompanying figures briefly described as follows. In the drawings, reference numerals designate like or corresponding, but not necessarily identical, elements.

Figure 1:
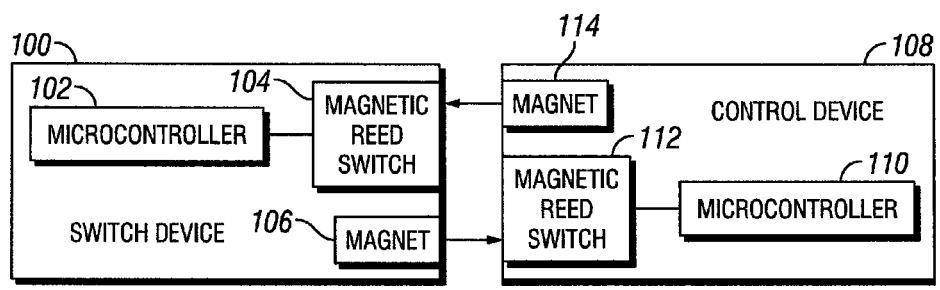
FIG. 1 illustrates a switch device and a control device with paired magnetic reed switching, in accordance with example embodiments of the present disclosure.

The drawings illustrate only example embodiments of methods, systems, and devices for commissioning a wireless lighting device with a magnetic reed switch, and are therefore not to be considered limiting of its scope. Such methods, systems, and devices may admit to other equally effective embodiments that fall within the scope of the present disclosure. The elements and features shown in the drawings are not necessarily to scale, emphasis instead being placed upon clearly illustrating the principles of the example embodiments. The methods shown in the drawings illustrate certain steps for carrying out the techniques of this disclosure. However, the methods may include more or less steps than explicitly illustrated in the example embodiments. Two or more of the illustrated steps may be performed substantially simultaneously or in an alternate order. Moreover, one or more steps in the illustrated methods may be replaced by one or more equivalent steps known in the art to be interchangeable with the illustrated step(s). In one or more embodiments, one or more of the features shown in each of the figures may be omitted, added, repeated, and/or substituted. Accordingly, embodiments of the present disclosure should not be limited to the specific arrangements of components shown in these figures.

DETAILED DESCRIPTION OF THE EXAMPLE EMBODIMENTS

In the following detailed description of the example embodiments, numerous specific details are set forth in order to provide a more thorough understanding of the disclosure herein. However, it will be apparent to one of ordinary skill in the art that the example embodiments herein may be practiced without these specific details. In other instances, well-known features have not been described in detail to avoid unnecessarily complicating the description.

Example embodiments disclosed herein are directed to systems and methods for commissioning and controlling a lighting system having a plurality of lighting devices. Specifically, the system uses a magnetic reed switch in the wireless light switch and/or in the control device, such as an occupancy sensor. The magnetic reed switch can be closed by placing a magnet near the switch. Closing the magnetic reed switch closes a circuit within the switch or control device activates the switch or the control device. Once activated the switch or control device can transmit its unique address, commonly referred to as its MAC address, and wait to receive an acknowledgement from the device with which it is to be joined as part of the commissioning process.

For example, if a magnetic reed switch within an occupancy sensor is closed, the occupancy sensor is activated. The occupancy sensor begins transmitting its unique address via a radio frequency to nearby devices. Once the occupancy sensor has been activated, a switch for a wireless light fixture can also be activated by placing a magnet nearby the switch, causing a magnetic reed switch within the light switch to close. Activating the light switch places it in commissioning mode, meaning it can detect and acknowledge the unique address transmission from the occupancy sensor. The light switch stores the unique address of the occupancy sensor in non-volatile memory and transmits its own unique address to the occupancy sensor. Once the occupancy sensor receives and stores the light switch's unique address in the occupancy sensor's non-volatile memory, the light switch and the occupancy sensor have been commissioned or joined. Once the light switch and the occupancy sensor have been joined, they can continue to communicate with each other until one of the devices is reset in a new commissioning process. In certain embodiments, the light switch can be joined with multiple occupancy sensors.

Referring now to the figures, FIG. 1 illustrates a switch device 100 and a control device 108 with paired magnetic reed switching, in accordance with example embodiments of the present disclosure. The switch device 100 includes a first microcontroller 102, a first magnetic reed switch 104, and a first magnet 106. Likewise, the control device 108 includes a second microcontroller 110, a second magnetic reed switch 112, and a second magnet 114. In certain example embodiments, the switch device 100 is a wireless light switch and the control device 108 is an occupancy sensor. In certain example embodiments, the switch device 100 is a line powered wall switch. In certain example embodiments, the control device 108 is a battery powered wireless sensor that can be detachably mounted near a door.

In certain example embodiments, in the switch device 100, the first magnetic reed switch 104 is electrically coupled to the first microcontroller 102. Closing, or activating, the first magnetic reed switch 104 puts the switch device 100 into a commissioning mode, in which the switching device 100 is ready to be joined to another device, such as the control device 108. Similarly, in certain example embodiments, in the control device 108, the second magnetic reed switch 112 is coupled to the second microprocessor 110. Closing, or activating, the second magnetic reed switch 112 puts the control device 108 into a commissioning mode, in which the control device 108 is ready to be joined to another device, such as the switch device 100. Both of the magnetic reed switches 104, 112 are closed when a magnet is brought within a certain proximity of the magnetic reed switch 104, 112. Thus, in certain example embodiments, if the switch device 100 and the control device 108 are brought into alignment such that the first magnet 106 of the switch device 100 is within the certain proximity of the second magnetic reed switch 112 of the control device 108 and the second magnet 114 of the control device 108 is within the certain proximity of the magnetic reed switch 104 of the switch device 100, both of the magnetic reed switches 104, 112 will close, bringing the switch device 100 and the control device 108 into commissioning mode.

In certain example embodiments, once the switch device 100 and the control device 108 enter the commissioning state, the devices 100, 108 exchange their unique addresses via wireless communications over antennas present on each respective microcontroller 102, 110. The switch device 100 stores the address of the control device 108 in a non-volatile memory coupled to or in the first microcontroller 102. Likewise, the control device 108 stores the address of the switch device 100 in a non-volatile memory of the second microcontroller 110. Thus, the devices 100, 108 are commissioned and joined with each other. The joined devices can communicate going forward, providing control commands, feedback signals, status signals, and/or the like.

Figure 2:
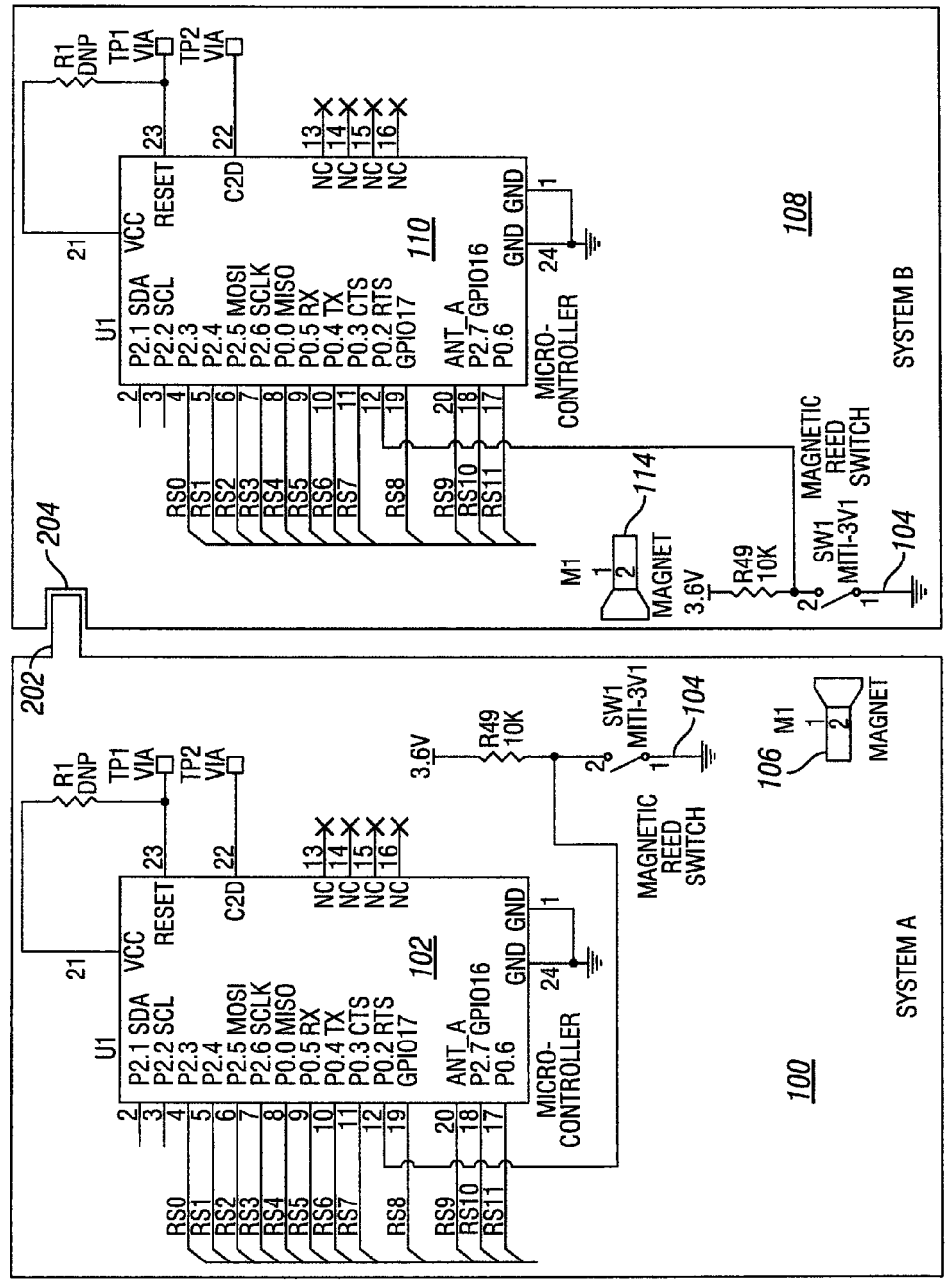
FIG. 2 illustrates example schematic diagrams of the switch device and the control device of FIG. 1, in accordance with example embodiments of the present disclosure.

FIG. 2 illustrates example schematic diagrams of the switch device 100 and the control device 108 of FIG. 1, in accordance with example embodiments of the present disclosure. In certain example embodiments, the switch device 100 includes a first alignment key 202 and the control device 108 includes a second alignment key 204, in which the first and second alignment keys 202, 204 fit together to bring the switch device 100 and the control device 108 into proper alignment. When the devices 100, 108 are properly aligned, the first magnet 106 of the switch device 100 is within the certain proximity of the magnetic reed switch 112 of the control device 108 and the second magnet 114 of the control device 108 is within the certain proximity of the second magnetic reed switch 104 of the switch device 100, both of the magnetic reed switches 104, 112 will close, bringing the switch device 100 and the control device 108 into commissioning mode. The schematic shown in FIG. 2 illustrates one example of many circuits that can be implemented to carry out the techniques provided in this disclosure.

Figure 3:
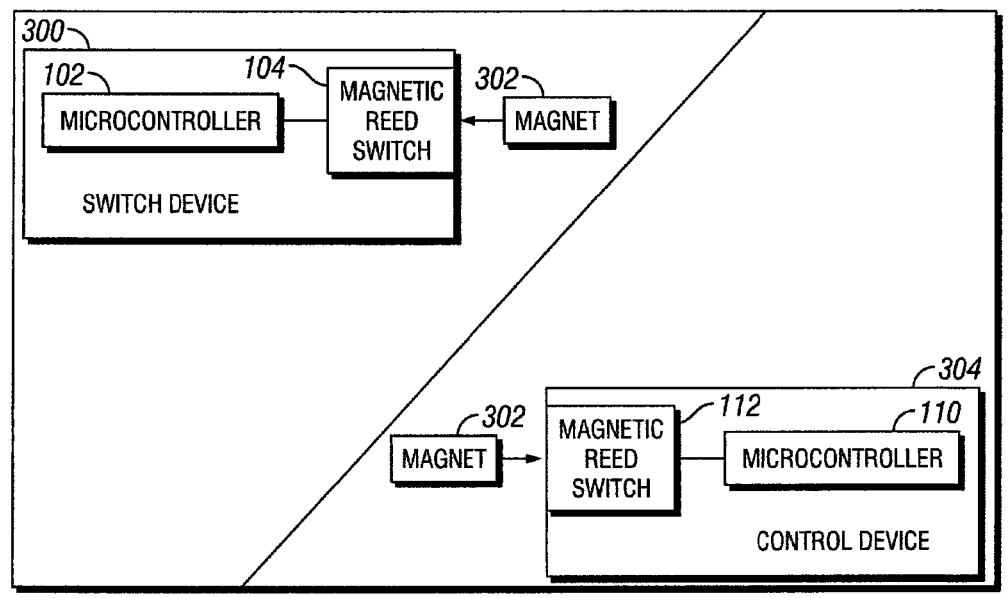
FIG. 3 illustrates a switch device and a control device with individual magnetic reed switching, in accordance with example embodiments of the present disclosure.

FIG. 3 illustrates a switch device 300 and a control device 304 with individual magnetic reed switching, in accordance with example embodiments of the present disclosure. In an example embodiment, the switch device 300 includes the first microcontroller 102 and the first magnetic reed switch 104, and may or may not include the internal first magnet 106. In an example embodiment, the control device 304 includes the second microcontroller 110 and the second magnetic reed switch 112, and may or may not include the internal second magnet 114. In such example embodiments, the switch device 300 and the control device 304 may not be proximate to each other to permit the alignment position shown in FIG. 1. Alternatively, one or both of the switch device 300 and the control device 304 may not include an internal magnet and thus cannot close other's magnetic reed switches 104, 112 through alignment or proximity. In such situations, a free magnet 302 can be waved near the magnetic reed switches 104, 110 of each device 300, 304 in order to activate each device 300, 304 for commissioning. The free magnet 302 is shown twice in FIG. 3 to show the two positions where it can be waved near the magnetic reed switches 104 and 110. In certain example embodiments, software installed on each microcontroller 102, 110 can control the timing window for the commissioning process. For example, if a user waves the magnet 302 near a device and does not see a "join" request, or detect communication, from another device within thirty seconds, the device would revert back to normal run mode.

Figure 4:
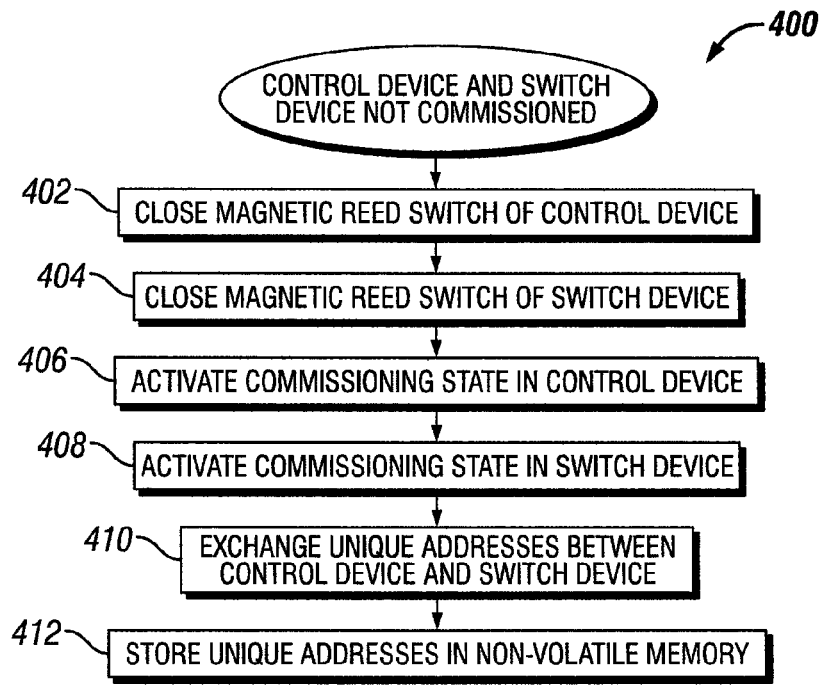
FIG. 4 illustrates a method of commissioning or joining a switch device with a control device through magnetic reed switching, in accordance with example embodiments of the present disclosure.

FIG. 4 illustrates a method 400 of commissioning or joining a switch device with a control device through magnetic reed switching, in accordance with example embodiments of the present disclosure. The method 400 starts with the control device and the switch device not yet commissioned or joined. The method 400 includes closing the magnetic reed switch of the control device (step 402). The magnetic reed switch of the control device can be closed by bringing a magnet within a certain proximity of the magnetic reed switch. This can be a free magnet or a magnet associated with the switch device. The method 400 likewise includes closing the magnetic reed switch of the switch device (Step 404). The magnetic reed switch of the switch device can be closed by bringing a magnet within a certain proximity of the magnetic reed switch. The method further includes activating a commissioning state in the control device (step 406) and likewise activating a commissioning state in the switch device (step 408). When both devices are placed in the commissioning state, the control device and the switch device communicate and exchange their respective unique addresses with each other (step 410). The devices then store the other's unique address in non-volatile memory (step 412), and are joined. The foregoing solution can also be applied to multiple switch devices 300 or control devices 304. For example, in one application, a user may want to have ten control devices 304 control one switch device 300. Each of the control devices 304 can be joined with the switch device 300 through a process similar to the one described above, and/or by repeating the process above for each control device. A similar process can also be used to have one control device 304 control multiple switch devices 300. In certain example embodiments, a successful commissioning is indicated by a blinking LED or other visual or audible indication from one or both of the devices.

Figure 5:
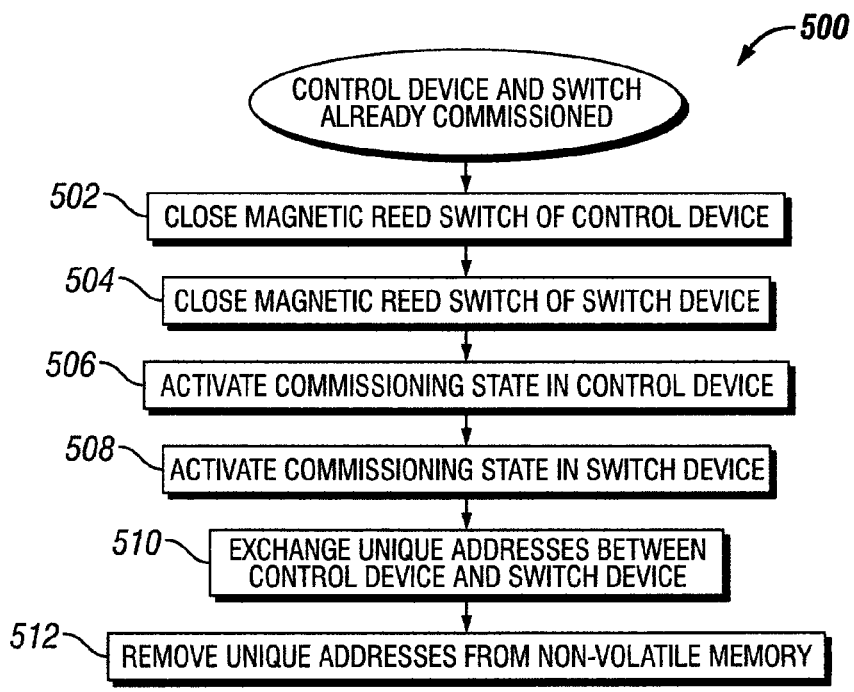
FIG. 5 illustrates a method of decommissioning a switch device from a control device through magnetic reed switching, in accordance with example embodiments of the present disclosure.

After the control device and the switch device have been commissioned or joined, the devices can be decommissioned or communicatively separated through a similar decommissioning process. In one example embodiment, if two devices that have already been joined are put through a subsequent commissioning process, the software installed on the microcontroller will consider the second commissioning process to be a decommission process. During the decommission process, a device removes from non-volatile memory the unique address of a joined device. FIG. 5 illustrates a method 500 of decommissioning the switch device from the control device with magnetic reed switching, in accordance with example embodiments of the present disclosure. The method 500 starts with the control device and the switch device already commissioned or joined. The method 500 includes closing the magnetic reed switch of the control device (step 502). The magnetic reed switch of the control device can be closed by bringing a magnet within a certain proximity of the magnetic reed switch. This can be a free magnet or a magnet associated with the switch device. The method 500 likewise includes similarly closing the magnetic reed switch of the switch device (Step 504). The method further includes activating a decommissioning state in the control device (step 506) and likewise activating a decommissioning state in the switch device (step 508). In certain example embodiments, when the devices are currently joined, closing the magnetic reed switches activates the decommissioning state whereas when the devices are not joined, closing the magnetic reed switches activates the commissioning state. When both devices are placed in the decommissioning state, the control device and the switch device communicate and exchange their respective unique addresses with each other (step 510). The devices then identify the other's unique address stored in non-volatile memory and remove that address from the non-volatile memory (step 512). The devices are thereby decommissioned.

The example embodiments make reference to switch devices, light fixtures, control devices, and various types of data transmission technologies, which are provided as examples only. The light fixture can include a wide range of lighting device types and applications. Likewise, in certain embodiments, the control devices could be any number of devices that detect ambient light or an occupant. The example data transmission technologies may likewise be replaced or used in conjunction with other communication means.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the example embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

I claim:

1. A wireless light system comprising:
   a light switch comprising a first microcontroller, a first wireless transceiver, a first magnetic reed switch, and a first magnet; and
   a control device comprising a second microcontroller, a second wireless transceiver, a second magnetic reed switch, and a second magnet,
      wherein when the light switch and the control device are aligned, the first magnetic reed switch of the light switch is closed by the second magnet of the control device and the second magnetic reed switch of the control device is closed by the first magnet of the light switch, wherein, when the second magnetic reed switch is closed by the first magnet, the control device transmits via the second wireless transceiver a second unique address to the first wireless transceiver, and wherein, when the first magnetic reed switch is closed by the second magnet and when the first wireless transceiver receives the second unique address, the first wireless transceiver transmits to the second wireless transceiver a first unique address.

2. The wireless light system of claim 1, wherein the control device is one of an occupancy sensor and an ambient light sensor.

3. The wireless light system of claim 1, wherein the light switch transmits the first unique address to a plurality of control devices and receives a unique address from each of the plurality of control devices.

4. The wireless light system of claim 1, wherein the control device transmits the second unique address to a plurality of light switches and receives a unique address from each of the plurality of light switches.

5. The wireless light system of claim 1, wherein when the light switch receives the second unique address of the control device and the control device receives the first unique address of the light switch, the light switch is controllable by the control device.

6. A wireless light system comprising:
a switch device comprising a first microcontroller and a first magnetic reed switch; and
a control device comprising a second microcontroller and a second magnetic reed switch,
wherein when the switch device and the control device are aligned, the first magnetic reed switch of the switch device is closed by a second magnet of the control device and the second magnetic reed switch of the control device is closed by a first magnet of the switch device,
wherein, when the second magnetic reed switch is closed by the first magnet, the control device transmits a second unique address to the switch device;
wherein, when the first magnetic reed switch is closed by the second magnet and when the switch device receives the second unique address, the switch device transmits a first unique address to the control device; and
wherein, when the switch device receives the second unique address and the control device receives the first unique address, the switch device and the control device are communicatively coupled.

7. The wireless light system of claim 6, wherein when the switch device receives the second unique address from the control device and the control device receives the first unique address from the switch device, the switch device is controllable by the control device.

8. The wireless light system of claim 6, wherein the switch device transmits the first unique address to a plurality of control devices and receives a unique address from each of the plurality of control devices.

9. The wireless light system of claim 6, wherein the control device transmits the second unique address to a plurality of switch devices and receives a unique address from each of the plurality of switch devices.

10. The wireless light system of claim 6, wherein the switch device stores the second unique address in a first non-volatile memory and the control device stores the first unique address in a second non-volatile memory.

11. A method of commissioning a switch device and a control device, comprising:
closing a first magnetic reed switch in the switch device by a second magnet in the control device;
closing a second magnetic reed switch in the control device by a first magnet in the switch device;
transmitting a first unique address from the switch device to the control device when the first magnetic reed switch is closed and when the switch device receives a second unique address from the control device;
transmitting the second unique address from the control device to the switch device when the second magnetic reed switch is closed;
receiving and storing the first unique address in the control device; and
receiving and storing the second unique address in the switch device.

12. The method of claim 11, further comprising:
decommissioning the switch device and the control device, wherein decommissioning comprises:
closing the first magnetic reed switch in the switch device;
closing the second magnetic reed switch in the control device;
transmitting the first unique address from the switch device to the control device;
transmitting the second unique address from the control device to the switch device;
identifying and removing the first unique address from the control device; and
identifying and removing the second unique address from the switch device.

13. The method of claim 11, wherein closing the first magnetic reed switch and closing the second magnetic reed switch comprise aligning the switch device and the control device in a certain configuration with each other.

14. The method of claim 11, wherein closing the first magnetic reed switch and closing the second magnetic reed switch comprise waving a magnet within a certain proximity of the first magnetic reed switch and the second magnetic reed switch.

15. The method of claim 11, wherein, when the switch device receives the second unique address and the control device receives the first unique address, the switch device and the control device are communicatively coupled.

16. The method of claim 15, further comprising:
producing an audible or visual indication from the switch device and/or control device when the switch device and the control device are communicatively coupled.

* * * * *